F. W. HORN.
DIRECTION INDICATOR FOR AUTOMOBILES.
APPLICATION FILED SEPT. 4, 1917.

1,255,883.

Patented Feb. 12, 1918.
2 SHEETS—SHEET 1.

Witness
W. Siebler

Inventor
F. W. Horn
By R. J. McCarty
his Attorney

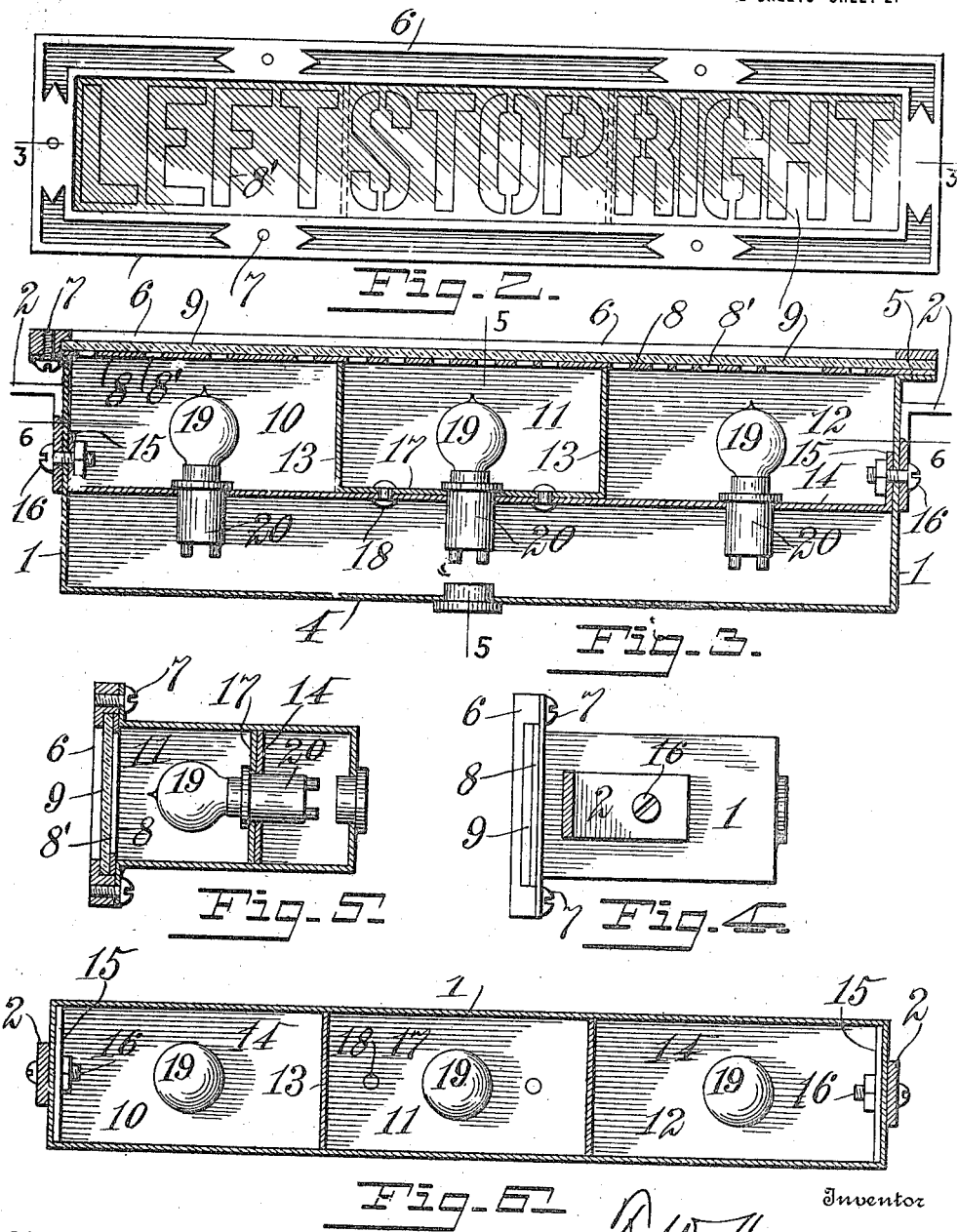

UNITED STATES PATENT OFFICE.

FREDERICK W. HORN, OF DAYTON, OHIO.

DIRECTION-INDICATOR FOR AUTOMOBILES.

1,255,883.

Specification of Letters Patent.  Patented Feb. 12, 1918.

Application filed September 4, 1917.  Serial No. 189,430.

*To all whom it may concern:*

Be it known that I, FREDERICK W. HORN, a citizen of the United States, residing at Dayton, in the county of Montgomery and State of Ohio, have invented certain new and useful Improvements in Direction-Indicators for Automobiles, of which the following is a specification.

This invention relates to certain improvements in illuminated indicators for indicating the turns or direction of travel of automobiles on streets and public highways when approaching the corners of streets or intersections of roads. The invention provides a form of device for indicating in the rear of the automobile whether the car will turn to the right or left and also when it has stopped. The indications are displayed in a conspicuous manner so that they may be observable at quite a distance from the automobile and while the indications are arranged relatively close together in order to utilize space the exhibition of one indication at a time takes place through the lighted lamp in the rear of that particular indication. The lamps are in circuit with the battery and each has its own particular push button by means of which the lamp is placed in circuit. The object of the invention is to provide such form of indicator in which the casing, the interior division walls and the supporting brackets are united and held by two fastening members which hold such parts rigidly united and in position and permit of the casing and the division walls being readily removed for repairs and for cleaning the device and replaced.

Figure 1:
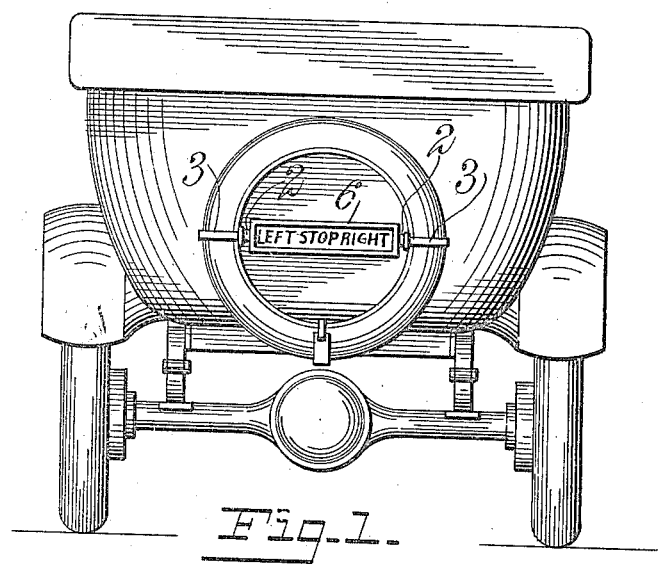
Figure 7:
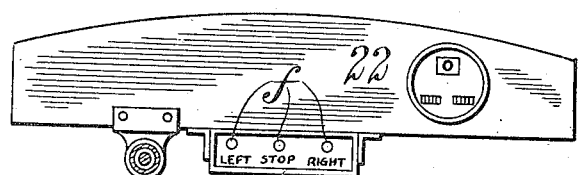
Figure 8:
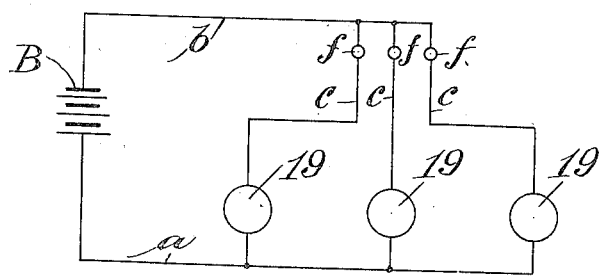

Referring to the accompanying drawings Figure 1 is an elevation of the rear end of an automobile showing my improved direction indicator in position. Fig. 2 is a front elevation of the indicator detached from its support in the rear of the automobile. Fig. 3 is a sectional view of the indicator on the line 3—3 of Fig. 2 showing the interior construction thereof and the position of the lamps in their respective inclosures. Fig. 4 is an end elevation of the indicator. Fig. 5 is a sectional view thereof on the line 5—5 of Fig. 3. Fig. 6 is a sectional view on the line 6—6 of Fig. 3. Fig. 7 is a detailed view of the instrument board of an automobile with the operator's indicator shown in position thereon and Fig. 8 is a diagram showing the electric circuit containing the lamps and the push buttons for controlling the lamps for the signaling purposes.

In a detailed description of the invention similar reference characters indicate corresponding parts in the drawings and the description. The indicator proper consists of an oblong rectangular casing 1. This is the outer casing of the device and it may, of course, be of any desirable shape such for example as triangular or round providing suitable space is provided for indicating the three essential indications, to wit, "Left," "Right" and "Stop." To have these indications, however, in a straight line is thought to be preferable for the reason that the indications are more easily readable and possibly less space is occupied by the indicator. The indicator may be placed at the rear of the vehicle at any convenient point. In the drawings I have shown it conveniently and conspicuously arranged at a more elevated position and have utilized the clamps which support the extra tire in the rear of the automobile as a means for mounting said indicator in such position. The indicator is so mounted by means of two end brackets 2 which are secured to the ends of the casing 1 and are conveniently secured to the two horizontal tire clamps 3, which hold the extra tire in the rear of the automobile. The casing 1 consists of an integral back wall 4 and the front thereof terminates in margins or flanges 5 to which is united an open frame 6 of ornamental design. The open frame 6 has its margins provided with openings by means of which it is secured to the margins of the casing 1 by a suitable number of screws 7 which penetrate openings in the margins of the casing and the margins of the frame. Placed between the margins of the open frame 6 and the casing 1 is a plate 8 from which are stamped openings 8' forming the letters "Left," "Stop," "Right," the word "Stop" being in the center thereof. Over this plate so stamped with the letters indicated is a glass panel 9, preferably a red glass panel, both the panel 9 and the lettered strip 8 being insertible in their positions by sliding them in grooves in the margin of the frame 6 through an end of said frame. The space in the rear of the lettered plate 8 and the glass 9 is partitioned off into three compartments, 10, 11 and 12, one of said compartments being in the rear of each indication and the partition walls 13 being impervious to light so that when the lamp of one compartment is extinguished the illumination from the adjacent compartment is excluded from the compartment having the extinguished light. These compartments are provided by means of a longitudinal plate 14 having end flanges 15 which lie on the interior of the casing 1 against the ends thereof and the said plate is held in position by means of a bolt 16 which penetrates openings in the ends of the casing 1 and in the flanges 15. These bolts 16 are also utilized to secure the brackets 2 by which the indicator is mounted in its position as before specified. The division walls 13 which provide the three separate light chambers are formed by means of a plate 17 from which the partition walls 13 are bent, said plate 17 being united to the plate 14 by rivets 18 and the outer ends of said division walls 13 being instrumental in supporting the perforated plate 8 at the center thereof as well as the glass panel 9. In each of these compartments a lamp or bulb 19 is placed, preferably formed of red glass. These lamps are mounted in lamp sockets 20 which in turn are mounted in the plate 14. The plate 14 has the lamps supplied to it before being placed in position. The manner of attaching the plate 14 enables it to be easily removed from the casing when it becomes necessary to renew a lamp or lamps, the bolts 16 being a simple and convenient means for securing said plate in position as well as the casing. The circuit connections for the lamps 19 are shown in the diagram Fig. 8. The devices or lamps for illuminating the indications are provided with circuits extending from a generator B. The lamps have permanent connections with one pole of the generator through a wire or conductor $a$ and with the other pole of the generator through wires or conductors $b$ and $c$ and switches or push buttons $f$. As shown in Fig. 7 the push buttons $f$ are arranged on the instrument board 22 of the automobile in front of the driver by means of a board or panel 21 with visual indications thereon associated with each push button and corresponding with the indications to be displayed in the rear of the automobile. The driver's indicator 21 might be placed in other suitable positions, such for example as on the steering wheel as will be obvious. It is thought, however, that it is out of the way and in a convenient place as shown in Fig. 7.

Having described my invention, I claim:

In a direction indicator for automobiles, an oblong rectangular casing, a longitudinal division plate having its ends terminated in flanges which fit against the ends of the casing, transverse division plates secured to the longitudinal plate and dividing the space within the casing on one side of said longitudinal plate into a series of lamp compartments, a plate having perforated indicating words arranged in front of said compartments, a glass panel arranged in front of said indicating plate, and supporting brackets united to the ends of the casing by means which penetrate said brackets and the flanges on the ends of the longitudinal division plate and whereby common means are provided for supporting the casing and uniting the division walls thereto, substantially as specified.

In testimony whereof I affix my signature.

FREDERICK W. HORN.